United States Patent Office 2,922,817
Patented Jan. 26, 1960

2,922,817

12α-DEOXYANHYDROTETRACYCLINES

Arthur Green, Emerson, N.J., assignor to American Cyanamid Company, New York, N.Y., a corporation of Maine No Drawing. Application October 29, 1957
Serial No. 693,018

12 Claims. (Cl. 260—559)

This invention relates to new compounds of the tetracycline series and more particularly to certain 12a-deoxyanhydrotetracyclines which may be represented by the following structural formula:

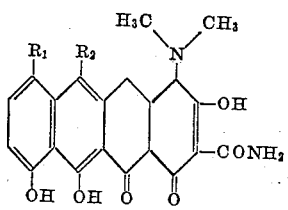

wherein $R_1$ is hydrogen or chlorine and $R_2$ is hydrogen or methyl, with the proviso that when $R_1$ is chlorine, $R_2$ is hydrogen.

For convenience, the novel compounds of this invention are referred to herein generally as 12a-deoxyanhydrotetracyclines. An appropriate chemical name for the tetracyline analogue of this invention according to Chemical Abstracts nomenclature is 4-dimethylamino-1,4,4a,5,12,12a - hexahydro - 3,10,11 - trihydroxy - 6-methyl-1,12-dioxo-2-naphthacenecarboxamide. An appropriate common name for this compound would be 12a - deoxyanhydrotetracycline. Appropriate common names for the other tetracycline analogues of this invention would be 7-chloro-6-demethyl-12a-deoxyanhydrotetracycline and 6-demethyl-12a-deoxyanhydrotetracycline and they will be so used throughout the specification and claims.

The novel compounds of this invention are prepared by the dehydration of certain 12a-deoxytetracyclines which may be represented by the following structural formula:

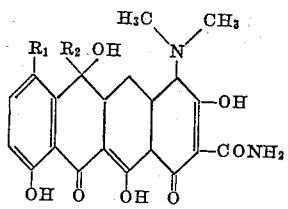

wherein $R_1$ is hydrogen or chlorine and $R_2$ is hydrogen or methyl, with the proviso that when $R_1$ is chlorine, $R_2$ is hydrogen. These 12a-deoxytetracyclines in themselves are new compounds and are prepared by the chemical reduction of the corresponding tetracyclines. Thus, 12a-deoxytetracycline, for example, is prepared by the chemical reduction of tetracycline using zinc in an aqueous solution of ammonia at a pH of from about 10 to about 13. Preferably the aqueous ammonia is used as a 10–20% solution. The use of aqueous ammonia as the solvent medium has been found to be necessary in order to form the novel intermediates of this invention, as other solvent media such as a mildly acidic medium, for example, either do not assist in the desired reduction of the tetracycline to the 12a-deoxytetracycline or else result in the formation of further and undesirable reduction products.

The reaction may be carried out at temperatures ranging from about 10° to 50° C. but preferably, the reaction is conducted at about room temperature, that is, from about 20° C. to about 25° C. The time of the reaction is not unduly critical and in general may range from about one hour to about four hours. A concentration of about 4% (w./v.) of the tetracycline antibiotic in the aqueous ammonia medium is satisfactory for the reaction. The zinc used for the reaction should preferably be in finely-divided form, for instance, zinc dust, and this metal should be used to an extent of at least 2 parts by weight of the metal per part by weight of the tetracycline antibiotic. Proportions of metal higher than about 4 parts by weight are generally not necessary.

The 12a-deoxytetracycline is recovered from the acidified reaction mixture by liquid-liquid extraction, preferably with the use of ethyl ether. Other solvents useful for this purpose are methyl acetate, ethyl acetate, methylene chloride and chloroform.

Since the 12a-deoxytetracyclines of this invention are amphoteric compounds, acid addition salts of the same type as those previously prepared from chlortetracycline and tetracycline may be readily prepared with the intermediates of this invention. In general, the preferred acids are mineral acids which include hydrochloric acid, sulfuric acid, nitric acid and phosphoric acid. The acid salts of the 12a-deoxytetracyclines may be prepared by treating the amphoteric compound with approximately one equivalent of the chosen acid.

As indicated, this reaction results in the removal of the hydroxy group from the 12a-position of the tetracycline ring system. The described chemical reduction is not limited to tetracycline but may be applied with equal facility to certain other tetracycline compounds. Thus, 6-demethyl-12a-deoxytetracycline is prepared by the described chemical reduction of 6-demethyltetracycline and 7-chloro-6-demethyl-12a-deoxytetracycline is prepared by the chemical reduction of 7-chloro-6-demethyltetracycline.

As indicated previously the 12a-deoxytetracyclines so-produced may then be converted to the novel 12a-deoxyanhydrotetracyclines of this invention. This reaction may be carried out with dehydrating agents such as any strong mineral acid, i.e., hydrogen chloride, hydrogen bromide, hydrogen iodide, sulfuric acid, phosphoric acid or such common dehydrating agents as thionyl chloride, phosphorous oxychloride and the like. Preferably, the reaction is carried out in a suitable solvent such as a lower alkanoic acid, i.e., glacial acetic acid, propionic acid, etc. or such solvents as lower alcohols, 1,2-dimethoxyethane, 2-methoxyethanol or 2-ethoxyethanol. The dehydration reaction proceeds smoothly at temperatures ranging from about 0° C. to about 100° C. and results in good yields of the corresponding anhydro compound. Preferably hydrogen bromide is used as the dehydrating agent and when so used the anhydro compound is isolated as the hydrobromide, but other acids listed above may be used for the dehydration and when so used the product is isolated as the corresponding mineral acid salt.

Because of the nature of the reaction, only certain of the 12a-deoxytetracyclines which may be prepared by chemical reduction may be converted to the novel compounds herein. Thus, 12a-deoxyanhydrotetracycline may be prepared by the dehydration of 12a-deoxytetracycline; 7-chloro-7-demethyl-12a-deoxyanhydrotetracycline may be prepared by the dehydration of 7-chloro-6-demethyl-12a-deoxytetracycline; and 6-demethyl-12a-deoxyanhydrotetracycline may be prepared by the dehydration of 6-demethyl-12a-deoxytetracycline.

The 12a-deoxyanhydrotetracyclines of this invention are biologically active, possessing activity against a variety of gram-positive and gram-negative microorganisms. The antibacterial spectrum of the 12a-deoxyanhydrotetracyclines is similar in many respects to that of the previously known tetracyclines except that, in general, the 12a-deoxyanhydrotetracyclines possess a somewhat lower order of activity. The anhydro compounds are of value, however, in that they are effective against certain tetracycline-resistant strains of bacteria such as *Streptococcus* γ No. 11, *Staphylococcus albus* No. 69 and *Streptococcus* β No. 80.

The antibacterial spectrum of the 12a-deoxyanhydrotetracyclines, representing the amount required to inhibit the growth of various typical bacteria, was determined in a standard manner by the agar dilution streak technique which is commonly used in testing new antibiotics. The minimal inhibitory concentrations, expressed in gammas per milliliter, of 12a-deoxyanhydrotetracycline against various test organisms is reported in the table below. For comparison purposes the antibacterial activity of tetracycline against the same organisms is also included.

TABLE 1

| Organism | Tetracycline Hydrochloride | 12a-Deoxyanhydrotetracycline |
|---|---|---|
| *Mycobacterium ranae* | 1.6 | 2.0 |
| *Mycobacterium smegmatis* ATCC 607 | 1.6 | 7.8 |
| *Staphylococcus aureus* 209 P | 0.8 | 7.8 |
| *Sarcina lutea* 1001 | 1.6 | 7.8 |
| *Bacillus subtilis* ATCC 6633 | 0.8 | 3.9 |
| *Streptococcus pyogenes* C 203 | 0.8 | 7.8 |
| *Streptococcus* γ No. 11 | >50 | 15.6 |
| *Staphylococcus albus* No. 69 | 50 | 7.8 |
| *Streptococcus* β No. 80 | >50 | 15.6 |
| *Staphylococcus aureus* NY 104 | 1.6 | 15.6 |
| *Bacillus cereus* No. 5 | 0.8 | 7.8 |

The invention will be described in greater detail in conjunction with the following specific examples.

*Example 1*

80 milligrams of 12a-deoxytetracycline are dissolved in 4 cc. of glacial acetic acid. The solution is warmed and filtered. To the filtrate ½ cc. of an acetic acid solution of hydrogen bromide is added and the mixture is warmed on a steam bath. 12a-deoxyanhydrotetracycline hydrobromide crystallizes out almost immediately and is filtered, washed with ether and dried at 60° C. Weight 70 milligrams.

*Example 2*

The procedure of the preceding example is repeated using an equivalent quantity of hydrogen chloride and acetic acid. 12a-deoxyanhydrotetracycline hydrochloride is obtained.

*Example 3*

Four hundred-forty milligrams of the hydrobromide prepared in Example 1 is dissolved in dilute sodium hydroxide, norited, and filtered over celite. The filtrate is diluted out five-fold and acidified carefully with glacial acetic acid. The aqueous solution is extracted with chloroform, using a total quantity of about 600 cc. The chloroform extract is washed once with 200 cc. water, and then dried over anhydrous sodium sulfate. The chloroform is concentrated to solids under vacuum. The solids are dissolved in dimethylformamide, filtered over celite and diluted with three volumes of hot water. The red free base crystallizes out. This recrystallization is repeated to give 138.3 milligrams of 12a-deoxyanhydrotetracycline.

*Example 4*

The procedure of Example 1 is followed except that 7-chloro-6-demethyl-12a-deoxytetracycline is used as the starting material instead of 12a-deoxytetracycline used in Example 1. The 7-chloro-6-demethyl-12a-deoxyanhydrotetracycline is produced.

*Example 5*

The procedure of Example 1 is followed except that 6-demethyl-12a-deoxytetracycline is used instead of 12a-deoxytetracycline used in Example 1. 6-demethyl-12a-deoxyanhydrotetracycline is produced.

*Example 6*

Two grams of tetracycline hydrochloride are dissolved in 50 cc. of aqueous 15% ammonium hydroxide. Four grams of zinc dust are added and the mixture is stirred for two hours. The excess zinc is filtered and the filtrate is treated with concentrated hydrochloric acid until pH 7 is obtained. The crude product is filtered and resuspended in 500 cc. of water and is redissolved at pH 1.5. The solution is clarified over diatomaceous earth. The pH of this filtrate is adjusted to 4.0–4.5. The small amount of solids is filtered. The clear filtrate is exhaustively extracted with ether in a liquid/liquid extractor. The ether extract yields 750 milligrams of crystalline 12a-deoxytetracycline which is recrystallized from N,N-dimethylformamide and methanol.

*Example 7*

The procedure of Example 6 is followed except that 7-chloro-6-demethyltetracycline is used as the starting material. 7-chloro-6-demethyl-12a-deoxytetracycline is produced.

*Example 8*

The procedure of Example 6 is followed except that 6-demethyltetracycline is used as the starting material. 6-demethyl-12a-deoxytetracycline is produced.

I claim:

1. A compound selected from the group consisting of 12a-deoxyanhydrotetracyclines of the formula:

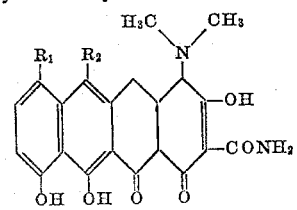

and the non-toxic acid addition salts thereof, wherein $R_1$ is a member of the group consisting of hydrogen and chlorine and $R_2$ is a member of the group consisting of hydrogen and methyl, with the proviso that when $R_1$ is chlorine, $R_2$ is hydrogen.

2. 12a-deoxyanhydrotetracycline.
3. 7-chloro-6-demethyl-12a-deoxyanhydrotetracycline.
4. 6-demethyl-12a-deoxyanhydrotetracycline.
5. A method of preparing a compound of the group consisting of 12a-deoxyanhydrotetracyclines of the formula:

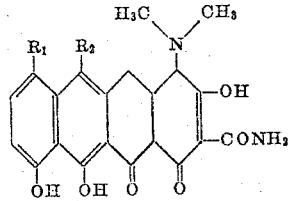

and the non-toxic acid addition salts thereof, wherein $R_1$ is a member of the group consisting of hydrogen and chlorine and $R_2$ is a member of the group consisting of hydrogen and methyl, with the proviso that when $R_1$ is chlorine, $R_2$ is hydrogen which comprises treating a tetracycline antibiotic selected from the group consisting of 12a-deoxytetracycline, 7-chloro-6-demethyl-12a-deoxytetracycline and 6-demethyl-12a-deoxytetracycline with an acid dehydrating agent at a temperature ranging from about 0° C. to about 100° C.

6. A method of preparing 12a-deoxyanhydrotetracycline which comprises treating 12a-deoxytetracycline with an acid dehydrating agent at a temperature ranging from about 0° C. to about 100° C.

7. A method of preparing 7-chloro-6-demethyl-12a-deoxyanhydrotetracycline which comprises treating 7-chloro-6-demethyl-12a-deoxytetracycline with an acid dehydrating agent at a temperature ranging from about 0° C. to about 100° C.

8. A method of preparing 6-demethyl-12a-deoxyanhydrotetracycline which comprises treating 6-demethyl-12a-deoxytetracycline with an acid dehydrating agent at a temperature ranging from about 0° C. to about 100° C.

9. A compound selected from the group consisting of 12a-deoxytetracyclines of the formula:

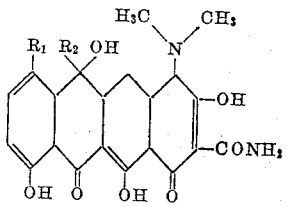

and the non-toxic acid addition salts thereof, wherein $R_1$ is a member of the group consisting of hydrogen and chlorine and $R_2$ is a member of the group consisting of hydrogen and methyl, with the proviso that when $R_1$ is chlorine, $R_2$ is hydrogen.

10. 12a-deoxytetracycline.
11. 6-demethyl-12a-deoxytetracycline.
12. 7-chloro-6-demethyl-12a-deoxytetracycline.

References Cited in the file of this patent

UNITED STATES PATENTS

| | | |
|---|---|---|
| 2,731,497 | McCormick et al. | Jan. 17, 1956 |
| 2,744,931 | Broschard | May 8, 1956 |

FOREIGN PATENTS

| | | |
|---|---|---|
| 166,216 | Australia | Dec. 5, 1955 |
| 167,750 | Australia | May 25, 1956 |

OTHER REFERENCES

Pasternack et al. J.A.C.S., vol. 74, pp. 1926–8 (1952).
Stephens et al.: J.A.C.S., vol. 76, pp. 3568 (1954).